United States Patent
Olarig et al.

(10) Patent No.: US 10,481,834 B2
(45) Date of Patent: Nov. 19, 2019

(54) ERASURE CODE DATA PROTECTION ACROSS MULTIPLE NVME OVER FABRICS STORAGE DEVICES

(71) Applicant: Samsung Electronics Co., Ltd., Suwon-si, Gyeonggi-do (KR)

(72) Inventors: Sompong Paul Olarig, Pleasanton, CA (US); Vikas K. Sinha, Sunnyvale, CA (US); Fred Worley, San Jose, CA (US); Ramdas P. Kachare, Cupertino, CA (US); Stephen G. Fischer, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 37 days.

(21) Appl. No.: 15/944,594

(22) Filed: Apr. 3, 2018

(65) Prior Publication Data
US 2019/0227744 A1    Jul. 25, 2019

Related U.S. Application Data

(60) Provisional application No. 62/621,435, filed on Jan. 24, 2018.

(51) Int. Cl.
| | |
|---|---|
| *G06F 3/06* | (2006.01) |
| *G06F 12/0868* | (2016.01) |
| *G06F 13/42* | (2006.01) |
| *G06F 12/0806* | (2016.01) |

(52) U.S. Cl.
CPC .......... *G06F 3/0659* (2013.01); *G06F 3/0619* (2013.01); *G06F 3/0689* (2013.01); *G06F 12/0806* (2013.01); *G06F 12/0868* (2013.01); *G06F 13/4221* (2013.01); *G06F 2213/0026* (2013.01)

(58) Field of Classification Search
CPC .... G06F 3/0659; G06F 3/0619; G06F 3/0689; G06F 12/0806; G06F 12/0868; G06F 13/4221
See application file for complete search history.

(56) References Cited

U.S. PATENT DOCUMENTS

| | | | |
|---|---|---|---|
| 9,122,810 B2 | 9/2015 | Hormuth et al. | |
| 9,152,182 B1* | 10/2015 | McMahon | ............ G06F 1/1658 |
| 9,619,389 B1 | 4/2017 | Roug | |
| 9,747,039 B1* | 8/2017 | Coleman | ................. G06F 3/061 |
| 9,842,084 B2 | 12/2017 | Friedman et al. | |
| 9,880,750 B1* | 1/2018 | Ravindran | ............ G06F 3/0613 |
| 2006/0168398 A1* | 7/2006 | Cadaret | ................. G06F 3/0625 |
| | | | 711/114 |
| 2008/0147844 A1* | 6/2008 | Islam | .................... G06F 3/0626 |
| | | | 709/224 |

(Continued)

*Primary Examiner* — Ryan Bertram
(74) *Attorney, Agent, or Firm* — Lewis Roca Rothgerber Christie LLP

(57) ABSTRACT

A system and method for providing erasure code data protection for an array of solid state drives. The solid state drives are connected to an Ethernet switch which includes a RAID control circuit, or a state machine, to process read or write commands that may be received from a remote host. The RAID control circuit, if present, uses a low-latency cache to execute write commands, and the state machine, if present, uses a local central processing unit, which in turn uses a memory as a low-latency cache, to similar effect.

21 Claims, 9 Drawing Sheets

(56) References Cited

U.S. PATENT DOCUMENTS

| | | | |
|---|---|---|---|
| 2009/0210618 A1* | 8/2009 | Bates | G06F 11/1084 |
| | | | 711/114 |
| 2010/0064023 A1* | 3/2010 | Basham | H04L 67/1097 |
| | | | 709/213 |
| 2013/0019062 A1* | 1/2013 | Bennett | G06F 3/0614 |
| | | | 711/114 |
| 2014/0250322 A1* | 9/2014 | Fleischmann | G06F 12/0246 |
| | | | 714/6.22 |
| 2015/0304423 A1 | 10/2015 | Satoyama et al. | |
| 2016/0085718 A1* | 3/2016 | Huang | H04L 29/08 |
| | | | 709/213 |
| 2016/0259597 A1* | 9/2016 | Worley | G06F 3/0688 |
| 2017/0220699 A1* | 8/2017 | Luo | H04L 67/1097 |
| 2017/0293428 A1 | 10/2017 | Radovanovic | |
| 2017/0357610 A1 | 12/2017 | Thompson | |
| 2018/0095915 A1* | 4/2018 | Prabhakar | G06F 9/455 |
| 2019/0104029 A1* | 4/2019 | Guim Bernat | H04L 41/5003 |

* cited by examiner

ERASURE CODE DATA PROTECTION ACROSS MULTIPLE NVME OVER FABRICS STORAGE DEVICES

CROSS-REFERENCE TO RELATED APPLICATION(S)

The present application claims priority to and the benefit of U.S. Provisional Application No. 62/621,435, filed Jan. 24, 2018, entitled "DISTRIBUTED DATA PLANE METHOD AND APPARATUS FOR PROVIDING ERASURE CODE DATA PROTECTION ACROSS MULTIPLE NVME OVER FABRICS STORAGE DEVICES (ESSDS)", the entire content of which is incorporated herein by reference.

FIELD

One or more aspects of embodiments according to the present invention relate to data storage, and more particularly to a system and method for providing erasure code data protection for an array of solid state drives.

BACKGROUND

Ethernet-attached nonvolatile memory express (NVMe) solid state drives (SSDs) (e.g. NVMe over Fabrics (NVMeoF) storage devices) may be used in various applications to store data. With NVMe over Fabrics configurations, optimizing Ethernet and SSD cost-performance may be challenging. For example, Ethernet speed significantly increased with the advent of 50 G/100 G technology, while SSD performance may depend on the peripheral component interconnect express (PCIe) interface and NAND flash technology. Fabric-attached SSDs present additional unique design challenges for supporting erasure code data protection since each device may provide point-to-point connectivity. Having an application specific integrated circuit (ASIC) external to storage devices, such as a controller for a redundant array of independent disks (RAID), e.g., a RAID on chip (ROC), may increase latency and degrade performance.

Some NVMe and NVMe over Fabrics SSDs support single-pathing IO. Some SSDs do support multiple dual pathing IO for higher system availability and improved system fault protection. Such SSDs may however be more costly and may provide slightly inferior performance.

Thus, there is a need for an improved system and method for providing erasure code data protection for an array of SSDs over a data plane, such as Ethernet.

SUMMARY

Aspects of embodiments of the present disclosure are directed toward a system and method for providing erasure code data protection for an array of solid state drives. The solid state drives are connected to an Ethernet switch which includes a RAID controller or RAID On Chip (ROC), or a state machine, to process read or write commands that may be received from a remote host. The RAID controller, (or "RAID control circuit"), if present, uses a low-latency cache to execute write commands, and the state machine, if present, uses a local central processing unit as ROC, which in turn uses a memory as a low-latency cache, to similar effect.

According to an embodiment of the present invention there is provided a system for providing protected data storage, the system including: an Ethernet switch; a plurality of Ethernet storage devices, one or more of the Ethernet storage devices being connected to the Ethernet switch; a local central processing unit, connected to the Ethernet switch, wherein the Ethernet switch includes: a media access control circuit; a virtual local area network circuit; a layer 2 processing circuit; a layer 3 processing circuit; and a RAID control circuit, the RAID control circuit being configured to control the Ethernet storage devices as a redundant array of independent disks, wherein the RAID control circuit is connected to: the media access control circuit; the virtual local area network circuit; the layer 2 processing circuit; and the layer 3 processing circuit.

In one embodiment, the system includes a cache device connected to the RAID control circuit.

In one embodiment, the RAID control circuit is configured, upon receipt of a write command including a write address, to: determine whether data corresponding to the write address are stored in the cache device; and when data corresponding to the write address are stored in the cache device, to modify the data stored in the cache device in accordance with the write command, and when data corresponding to the write address are not stored in the cache device: to allocate a space in the cache device, to read data from one or more Ethernet storage devices of the plurality of Ethernet storage devices into the space, and to modify the data in the space in accordance with the write command.

In one embodiment, the cache device has a latency lower than a latency of an Ethernet storage device of the plurality of Ethernet storage devices by at least a factor of 5.

In one embodiment, the Ethernet switch includes the cache device.

In one embodiment, the cache device has a latency lower than a latency of an Ethernet storage device of the plurality of Ethernet storage devices by at least a factor of 5.

In one embodiment, the Ethernet switch is on a single semiconductor die.

In one embodiment, the local central processing unit is configured, at system initialization, to configure the Ethernet switch.

In one embodiment, the Ethernet switch is configured to forward Ethernet packets, received at a host port of the system addressed to a storage Ethernet address of the system, to the RAID control circuit.

In one embodiment, the Ethernet switch is configured to disregard Ethernet packets received at a host port of the system addressed to an Ethernet address of an Ethernet storage device of the plurality of Ethernet storage devices.

In one embodiment, the system includes a peripheral component interconnect express (PCIe) switch, connected to one or more of the plurality of Ethernet storage devices and to the local central processing unit.

In one embodiment, the system includes a baseboard management controller, connected to the PCIe switch.

According to an embodiment of the present invention there is provided a system for providing protected data storage, the system including: an Ethernet switch; a plurality of Ethernet storage devices, one or more of the Ethernet storage devices being connected to the Ethernet switch; a local central processing unit, connected to the Ethernet switch, wherein the Ethernet switch includes: a media access control circuit; a virtual local area network circuit; a layer 2 processing circuit; a layer 3 processing circuit; and a state machine, wherein the state machine is connected to: the media access control circuit; the virtual local area network circuit; the layer 2 processing circuit; and the layer 3 processing circuit, and wherein the state machine and the local central processing unit are configured to control the Ethernet storage devices as a redundant array of independent disks.

In one embodiment, the system includes a memory connected to the local central processing unit.

In one embodiment, the state machine and the local central processing unit are configured, upon receipt of a write command including a write address, to: determine whether data corresponding to the write address are stored in the memory; and when data corresponding to the write address are stored in the memory, to modify the data stored in the memory in accordance with the write command, and when data corresponding to the write address are not stored in the memory: to allocate a space in the memory, to read data from one or more Ethernet storage devices of the plurality of Ethernet storage devices into the space, and to modify the data in the space in accordance with the write command.

In one embodiment, the memory has a latency lower than a latency of an Ethernet storage device of the plurality of Ethernet storage devices by at least a factor of 5.

In one embodiment, the Ethernet switch is on a single semiconductor die.

In one embodiment, the system includes a peripheral component interconnect express (PCIe) switch, connected to one or more of the plurality of Ethernet storage devices and to the local central processing unit.

In one embodiment, the system includes a baseboard management controller, connected to the PCIe switch.

In one embodiment, the state machine includes fewer than 200,000 gates.

According to an embodiment of the present invention there is provided a method for operating a storage system, the storage system including: an Ethernet switch; a plurality of Ethernet storage devices, one or more of the Ethernet storage devices being connected to the Ethernet switch; a local central processing unit, connected to the Ethernet switch, wherein the Ethernet switch includes: a media access control circuit; a virtual local area network circuit; a layer 2 processing circuit; a layer 3 processing circuit; and a RAID control circuit, the RAID control circuit being configured to control the Ethernet storage devices as a redundant array of independent disks, wherein the RAID control circuit is connected to: the media access control circuit; the virtual local area network circuit; the layer 2 processing circuit; and the layer 3 processing circuit, the storage system further including a cache device connected to the RAID control circuit, the method including, upon receipt of a write command including a write address: determining whether data corresponding to the write address are stored in the cache device; and when data corresponding to the write address are stored in the cache device, modifying the data stored in the cache device in accordance with the write command, and when data corresponding to the write address are not stored in the cache device: allocating a space in the cache device, reading data from one or more Ethernet storage devices of the plurality of Ethernet storage devices into the space, and modifying the data in the space in accordance with the write command.

BRIEF DESCRIPTION OF THE DRAWINGS

These and other features and advantages of the present invention will be appreciated and understood with reference to the specification, claims, and appended drawings wherein:

DETAILED DESCRIPTION

The detailed description set forth below in connection with the appended drawings is intended as a description of exemplary embodiments of a system and method for providing erasure code data protection for an array of solid state drives provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the scope of the invention. As denoted elsewhere herein, like element numbers are intended to indicate like elements or features.

Figure 1A:
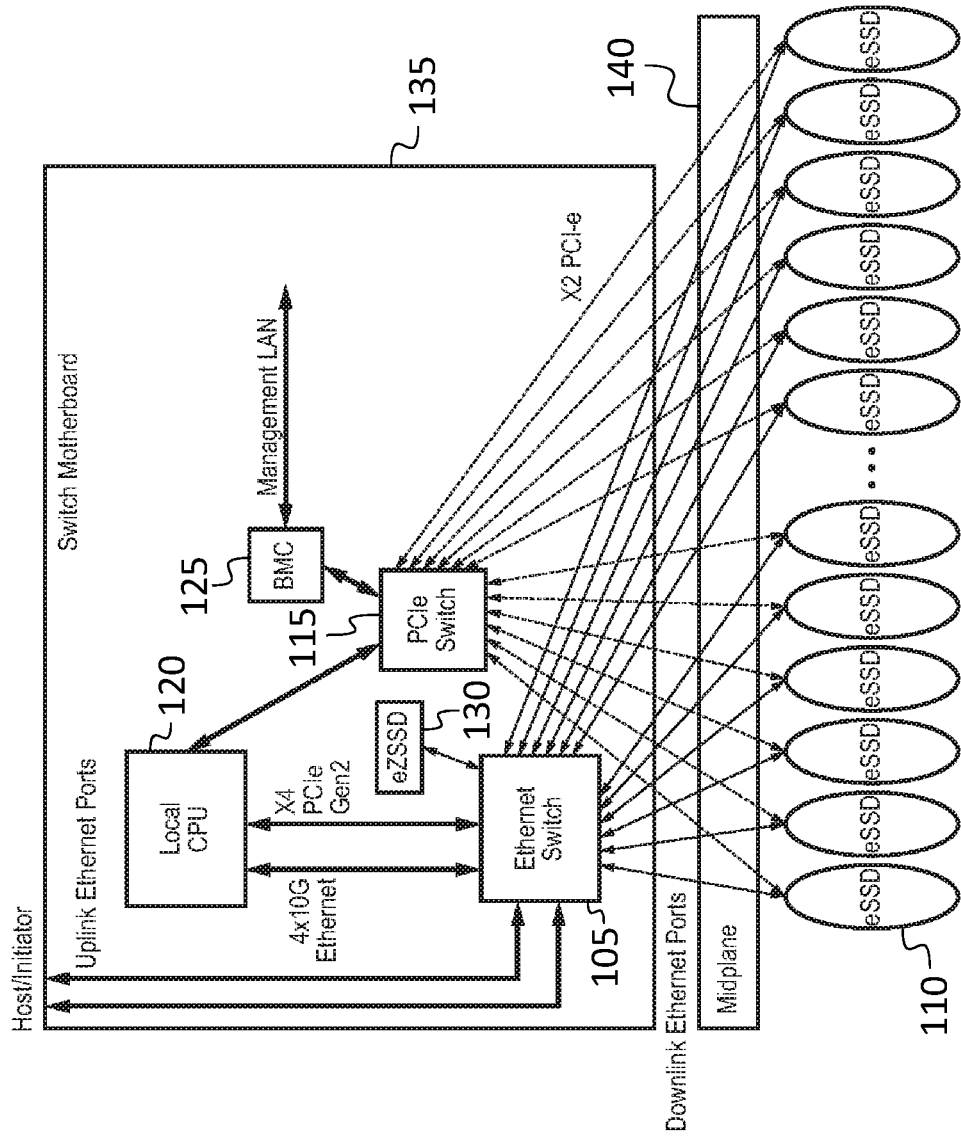
FIG. 1A is a block diagram of a storage system, according to an embodiment of the present invention.

Referring to FIG. 1A, in one embodiment, a storage system for providing protected data storage includes an Ethernet switch 105, connected to a plurality of Ethernet storage devices such as Ethernet solid state drives (eSSDs) 110, or other persistent storage devices with Ethernet interfaces. When the system is configured to operate as a redundant array of independent disks (RAID), as a result of the Ethernet switch's containing an embedded RAID control circuit, (e.g., a RAID controller on chip or a RAID on chip (ROC)) (as discussed in further detail below), the RAID controller being configured to control the redundant array of independent disks. The RAID controller may be part of the same semiconductor die (e.g., part of the same silicon complementary metal oxide semiconductor (CMOS) die) as the other circuits of the Ethernet switch 105, or it may be part of a separate die included in the same integrated circuit package as the other circuits of the Ethernet switch 105.

Figure 1B:
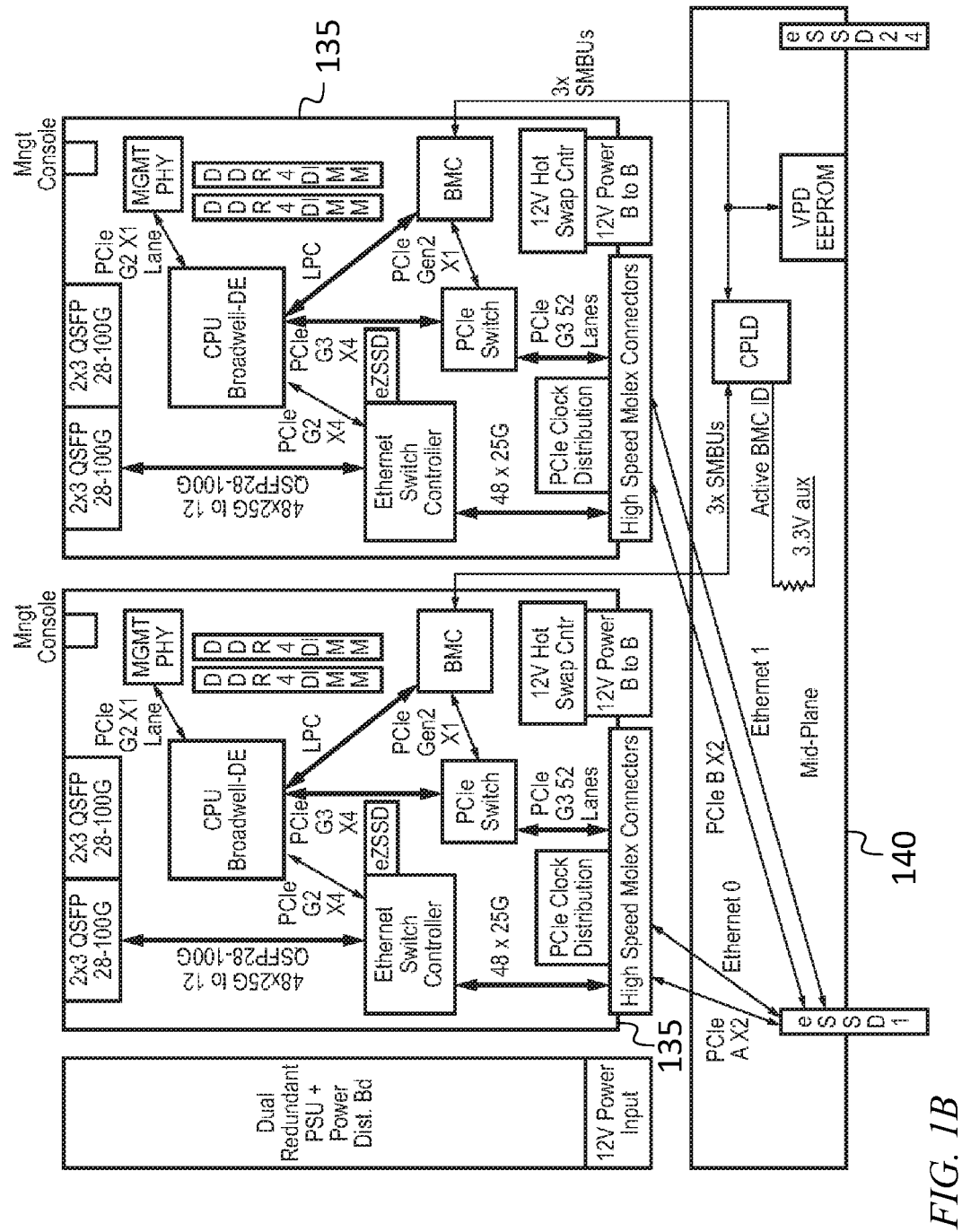
FIG. 1B is a block diagram of a storage system, according to an embodiment of the present invention.

The storage system further includes a PCIe switch 115 connected to the plurality of Ethernet solid state drives 110, a local central processing unit (CPU) 120 connected to the Ethernet switch 105 and to the PCIe switch 115, a board management controller (BMC) 125 connected to the PCIe switch 115, and a cache device 130 connected to the Ethernet switch 105. The elements except for the Ethernet solid state drives 110 may be mounted on a switch motherboard 135, which may be connected to the Ethernet solid state drives 110 through a midplane 140. As shown in FIG. 1B, in some embodiments two (or more) switch motherboards 135 may share a midplane 140 and a plurality of Ethernet solid state drives 110. The cache device 130 (e.g., the eZSSD) may be a flash memory storage unit employing low-latency flash memory such as Z-NAND™ flash memory, which may have a latency at least five times lower (e.g., 10 times lower) than the flash memory in the Ethernet solid state drives 110. Such a cache device 130 may be referred to as an eZSSD.

As mentioned in U.S. patent application Ser. No. 15/470, 774, filed Mar. 27, 2017, the entire content of which is incorporated herein by reference, erasure codes may be used in the storage system to protect the stored data in the event of failure or removal of one of the Ethernet solid state drives 110. The erasure codes for a data block may include (e.g., consist of) redundant additional information that may be used to reconstruct the data in the data block if a portion of the data are lost. The erasure codes may generally be stored on a separate Ethernet solid state drive 110 from the data that they protect, so that the failure or removal of any one Ethernet solid state drive 110 will not result in a loss of data; if the disk storing the erasure codes fails or is removed, the data are unaffected, and if the disk storing the data fails or is removed, the data may be recovered from the erasure codes.

Figure 2:
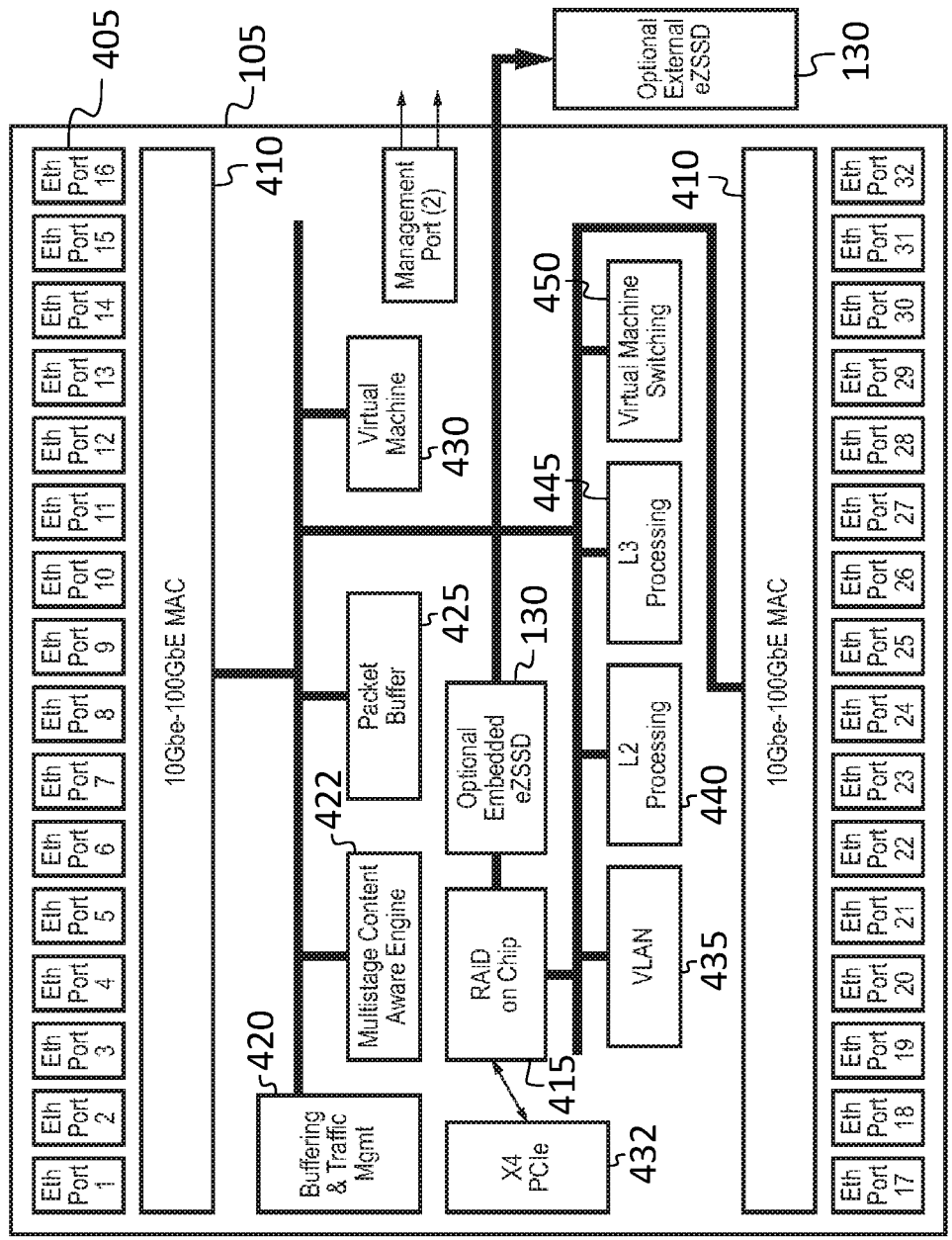
FIG. 2 is a block diagram of a Ethernet switch, according to an embodiment of the present invention.

FIG. 2 shows an internal block diagram of an Ethernet switch 105 (e.g., a modified Ethernet switch, having special capabilities relevant for embodiments of the present invention), according to some embodiments. The Ethernet switch 105 includes a plurality of Ethernet ports 405, connected to one or more media access control (MAC) circuits 410, and a RAID controller 415 (e.g., a RAID on chip circuit), as mentioned above. In some embodiments, also present in the Ethernet switch 105, and connected to the RAID controller 415, are a buffering and traffic management circuit 420, a multistage content aware engine 422, a packet buffer 425, a virtual machine 430, the cache device 130 (e.g., as an embedded eZSSD), a PCIe interface circuit 432, a virtual local area network circuit 435, a layer 2 processing circuit 440, a layer 3 processing circuit 445, and a virtual machine switching circuit 450. In some embodiments the cache device 130 may be external instead of internal (e.g., an external eZSSD may be present instead of the embedded eZSSD).

Figure 3:
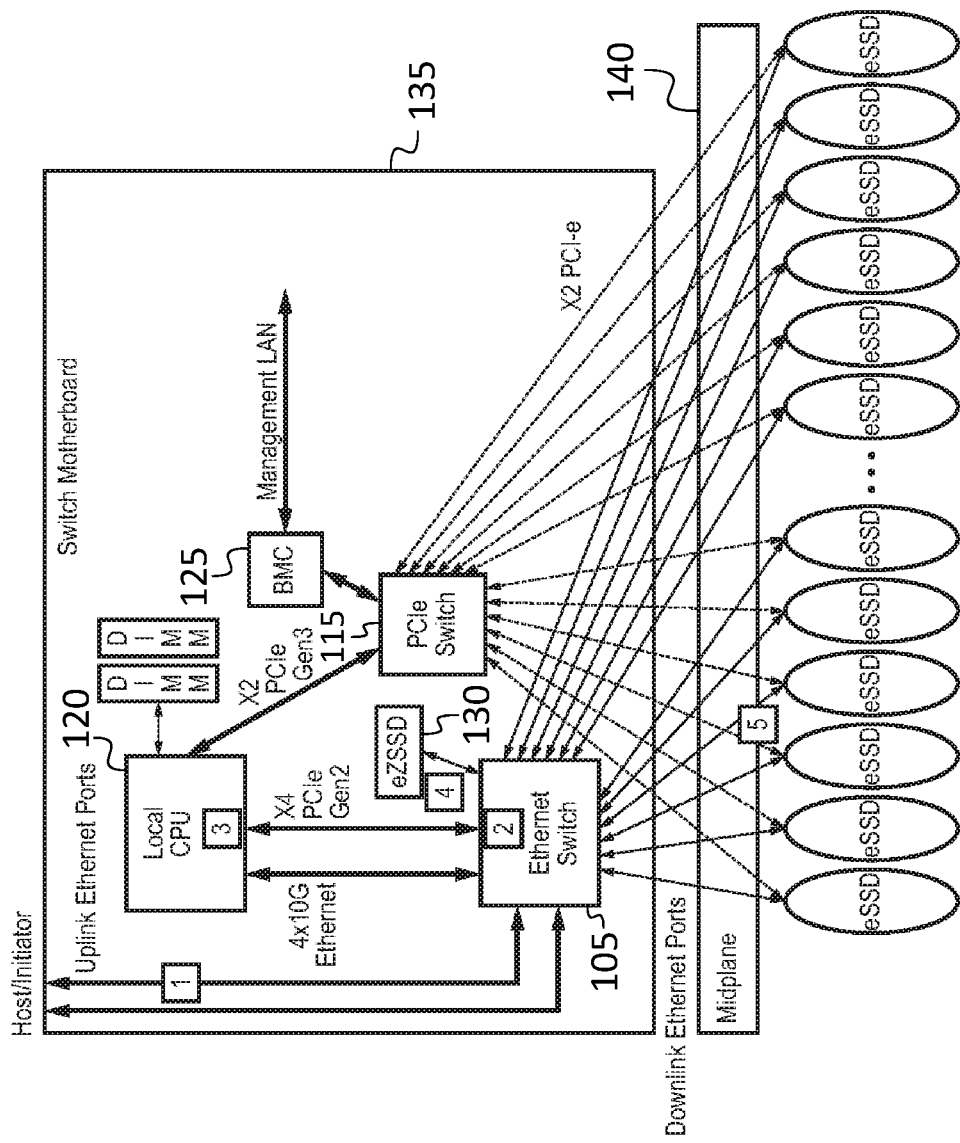
FIG. 3 is a block diagram of a storage system, according to an embodiment of the present invention.

Referring to FIG. 3, in operation a command (e.g., a read or write command) may be received by the Ethernet switch 105, and relayed by the Ethernet switch 105 to the local central processing unit 120. The local central processing unit 120 may then execute the command using suitable operations on the cache device 130, and, subsequently, the Ethernet solid state drives 110 may be updated in accordance with the contents of the cache device 130. This sequence of operations is indicated by squares containing the digits 1 through 5 in FIG. 3, and discussed in further detail below. In embodiments in which the RAID controller 415 is present the local central processing unit 120 is not required and may be absent.

For example, in operation, in a step identified by a square containing the digit 1 in FIG. 3, the remote host sends a command (e.g., a read command or a write command) to an Ethernet SSD through the Ethernet switch 105. If a RAID controller 415 and a cache device 130 are present as part of the Ethernet switch 105 then step 3 is not required. The read command will determine whether or not the data requested by the read command are present in the cache device 130 cache or not. If a cache hit occurs, then the requested data will be returned to the requesting host by the cache device 130 directly. If a cache miss occurs, the read command will be forwarded to one of the Ethernet solid state drives 110 whose requested data are stored. In this case, the RAID controller 415 knows exactly which Ethernet solid state drive 110 has the data. If RAID controller 415 or cache device 130 is not present, step 3 is used to determine where the requested data is located. In this case, the stripe manager running on the local central processing unit 120 will determine which Ethernet solid state drive 110 has the requested data. In this case, the local central processing unit 120 will generate a read/write command to the appropriate Ethernet solid state drive 110. Without caching, the latency of any request from the host will be extended due to additional RAID related processing. In some embodiments both RAID controller 415 and cache device 130 are part of the Ethernet switch 105 to minimize overall latency.

If the command is a write command, the Ethernet switch 105 forwards the packet (in a step identified by a square containing the digit 3 in FIG. 3) to the local central processing unit 120 and (in a step identified by a square containing the digit 4 in FIG. 3) to the cache device 130 to check for a cache hit. If there is no cache hit, the local central processing unit 120 and the RAID control circuit 415 perform (in a step identified by a square containing the digit 5 in FIG. 3) read-modify-write from all related stripes. The incoming write is posted inside the write buffer of the local central processing unit 120. An acknowledgement of write is sent back to the host. The execution of read and write commands is discussed in further detail below, in the context of FIGS. 6 and 7.

The board management controller 125 has a communication link to all Ethernet solid state drives 110, which may be used to detect the removal or installation of any Ethernet solid state drive 110. This link may be for example a PCIe link through a PCIe switch (and may use the PCIe sideband, e.g., the PRSNT# and If_Det# pins). The other method is through a complex programmable logic device (CPLD) where the CPLD is collecting all the status pins from all slots and generates an interrupt to notify whenever a drive has been hot added or hot removed. In this case, the local central processing unit 120 and the board management controller 125 are notified and react appropriately. The board management controller 125 can sense presence pin signals from all connected Ethernet solid state drives 110. Hence the board management controller 125 knows which Ethernet solid state drives 110 are present or removed, and it knows the status of each of the Ethernet solid state drives 110, using the NVMe management interface (NVMe-MI) protocol. The board management controller 125 notifies the local central processing unit 120 and the RAID control circuit 415 of any recently added or removed Ethernet solid state drive 110 by providing device ID and storage capacity of the added or removed device. When the local central processing unit 120 and the RAID control circuit 415 are notified (by the board management controller 125) that an Ethernet solid state drive 110 has been added, the local central processing unit 120 and the RAID control circuit 415 determine what action is appropriate, depending on what the current RAID level is and the minimum number of Ethernet solid state drives 110 (and respective drive capacities) necessary to support the current RAID level.

When one of the Ethernet solid state drives 110 is removed, the board management controller 125 notifies the local central processing unit 120 and the RAID controller 415 about the missing drive. Any subsequent host write command is then handled by the local central processing unit 120 and the RAID controller 415, which then perform reads from all Ethernet solid state drives 110 which store a portion of the stripe. The local central processing unit 120 then performs read-modify-write of the RAID stripe. and generates a new parity code. When one of the Ethernet solid state drives 110 fails, the local central processing unit 120 is notified and the RAID controller and board management controller 125 are notified in turn.

In normal operation, all of the Ethernet solid state drives 110 behind the local central processing unit 120 and the RAID controller 415 are hidden from the host/device data path. The local central processing unit 120 may, at system initialization, configure the Ethernet switch 105 to hide the Ethernet solid state drives 110 from the remote host. For example, the local central processing unit 120 may configure the Ethernet switch 105 so that Ethernet packets received at a "host port" (or "Uplink Ethernet Port") (to which the remote host is connected) addressed to the Ethernet address of one of the Ethernet solid state drives 110 are ignored, and so that Ethernet packets received at the host port addressed to an Ethernet address defined as the storage address of the storage system are forwarded to the RAID controller 415 (or to the state machine 805, in the embodiment of FIG. 8, discussed in further detail below). In this manner, the storage system will appear, to the local host, as a one or more Ethernet storage devices located at the storage address, and the Ethernet solid state drives 110 will be invisible to the local host (i.e., not directly accessible by the remote host). In some embodiments, the storage system may also support other Ethernet addresses, e.g., a configuration address, so that Ethernet packets received at the host port addressed to one of these other Ethernet addresses will be processed by the storage system (e.g., a configuration address, if supported, may make it possible for a remote host to query or set configuration parameters, or upload software or firmware to the storage system).

Figure 4:
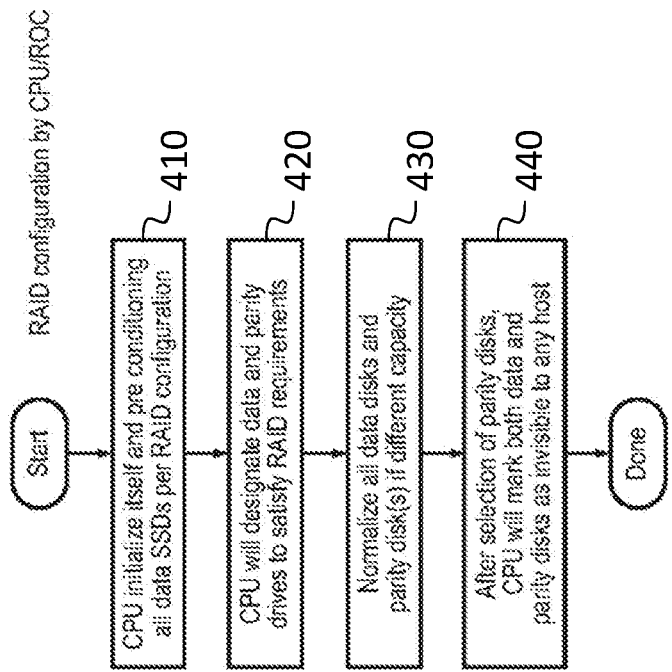
FIG. 4 is a flow chart of a method for configuring a storage system, according to an embodiment of the present invention.

FIG. 4 shows a flow chart of an initialization process. At 410, the local central processing unit 120 initializes itself and pre-conditions all of the data Ethernet solid state drives 110 in accordance with the RAID configuration to be used. At 420, the local central processing unit 120 designates data and parity drives to satisfy RAID requirements. At 430, the local central processing unit 120 normalizes all data disks and the parity disk or disks if they have different capacities. At 440, after the selection of parity disks, the local central processing unit 120 marks both data and parity disks as invisible to any host. When a RAID controller 415 is present, some or all of the operations performed by the CPU in FIG. 4 may instead be performed by the RAID controller 415.

Figure 5:
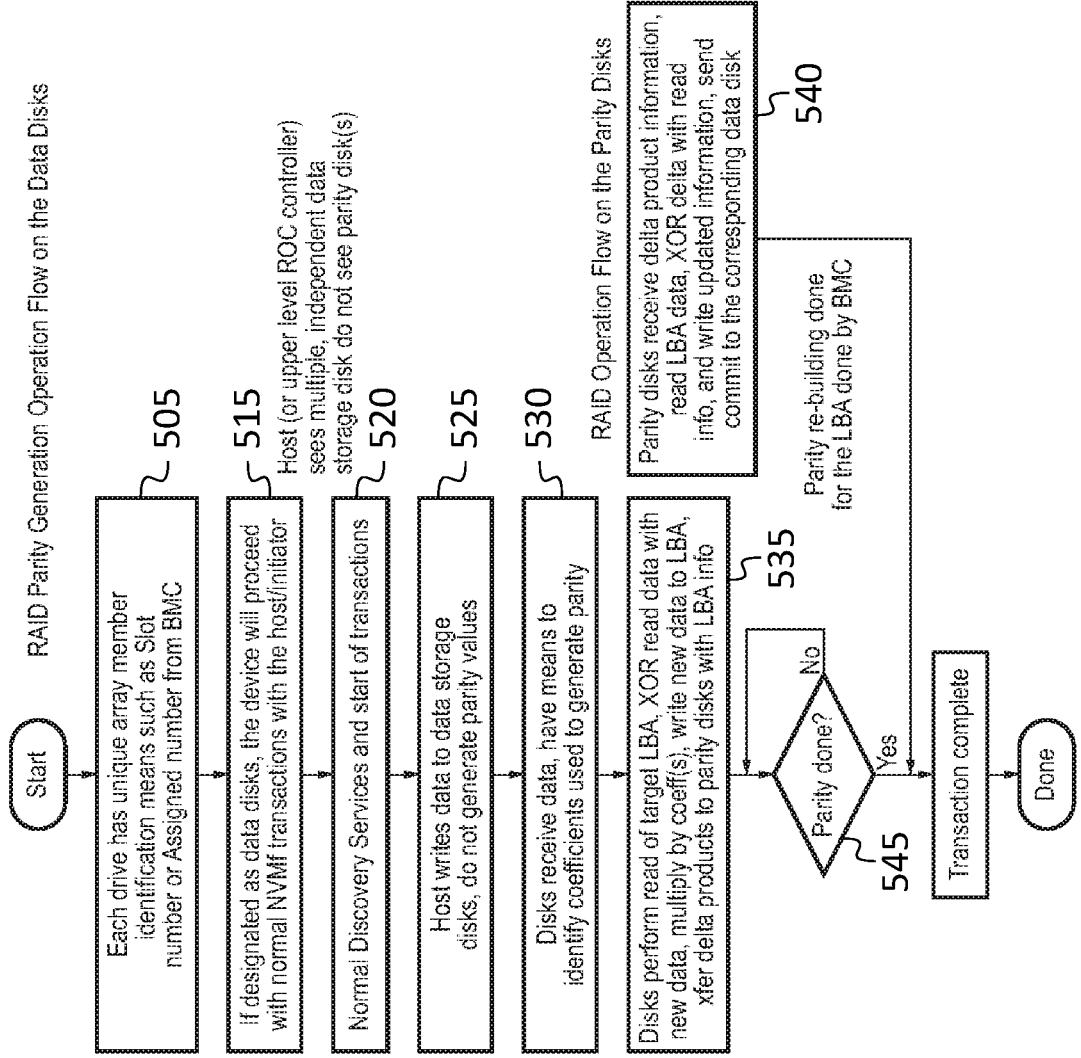
FIG. 5 is a flow chart of a method for generating parity data, according to an embodiment of the present invention.

FIG. 5 is a flowchart showing a method of parity generation, according to one embodiment. At 505, each Ethernet solid state drive 110 has a unique array member identification means such as a slot number or assigned number from the board management controller 125. At 515, if designated as a data disk, the Ethernet solid state drive 110 proceeds with normal NVMe of transactions with the host/initiator. At 520, normal discovery services are performed, and transactions start. At 525, the host writes data to data storage disks, and parity values are not generated. At 530, the Ethernet solid state drives 110 receive data, and have means to identify coefficients used to generate parity. At 535, the Ethernet solid state drives 110 perform read of target logical block address (LBA), XOR read data with new data, multiply by the respective coefficient (or coefficients), write new data to LBA, and transfer delta products to parity disks with LBA information. As used herein, delta products are the result of XOR operation of partial products before merging/combining with the write data. For example, for a write command, if there are a total of 4 data drives and one parity drive, the RAID controller 415 may have data returning from each drive independently. In this case, the RAID controller 415 may perform a partial XOR from one but fewer than 4 data drives. The write will be completed only when all data from all data drives are XOR'ed with the incoming write data and new parity products have been generated and updated. At 540, parity disks receive delta product information, read LBA data, XOR delta with read info, write updated information, and send commit to the corresponding data disk. At 545, if the calculation of parity data is not complete, the process loops back until it is complete (i.e., the process waits until the parallel process, at 540, is complete).

In some embodiments, software may operate as follows. As used herein, an "erasure coding set" is a set of disks over which erasure coding is performed, in order to provide fault tolerance against disk failures (erasures). The total number of disks in the erasure coding set is N=K+M, where K is the number of disks holding user data and M is the number of coding disks.

As used herein, a "write-ahead logging device", or "WAL device", is a device managed by the system and used for controlling the state of stripes as they are modified and read by a host interacting with the system.

As used herein, a "stripe" is a layout of data and erasure coding blocks for a defined range of addressable space available to a host for input and output (TO). A stripe may contain K data segments and M coding segments, where the segments are fixed size boundaries within a stripe corresponding to a fixed region on a disk in the erasure coding set.

As used herein, a "stripe state header" is a relatively small data structure which exists on the WAL device and indicates the state of a stripe as it is being modified or accessed. It may have a bitmap with a bit for each disk in the current erasure coding set, up to a defined maximum count of disks. Further, it may have a bit for each coding segment within the stripe where a 0 indicates that the segment does not contain valid coding bytes and a 1 indicates that the segment does have valid coding bytes.

As used herein, a "stripe manager" is a module that executes the set of operations or methods described here; it can be implemented in FPGA, ASIC, or in software (system/kernel mode or application/user mode) or alternative physical embodiment.

An exemplary stripe layout is shown in Table 1. It shows a layout for an erasure coding set with a total of six disks, with four disks used for data and two for coding. The location of the coding segments is distributed (as in RAID-5) to avoid difference in wear leveling between the data and coding disks.

TABLE 1

| | | | | | | |
|---|---|---|---|---|---|---|
| Stripe 0 | Code Seg. 0 | Code Seg. 1 | Data Seg. 0 | Data Seg. 1 | Data Seg. 2 | Data Seg. 3 |
| Stripe 1 | Data Seg. 0 | Code Seg. 0 | Code Seg. 1 | Data Seg. 1 | Data Seg. 2 | Data Seg. 3 |
| Stripe 2 | Data Seg. 0 | Data Seg. 1 | Code Seg. 0 | Code Seg. 1 | Data Seg. 2 | Data Seg. 3 |
| Stripe 3 | Data Seg. 0 | Data Seg. 1 | Data Seg. 2 | Code Seg. 0 | Code Seg. 1 | Data Seg. 3 |

A write method with delayed computation of coding data may be performed, by the stripe manager, as follows. When a write command is received from a host or initiator, the stripe number is computed from the offset (bytes or LBA) specified in the write command. The affected data segment numbers and coding segment numbers are calculated from the stripe number and the count of disks in the erasure coding set. An initial write redundancy level (WRL), which is a user-configurable number, is read from configuration settings to obtain the number of coding segments that have to be written before the write is acknowledged to the initiator. This represents the minimum fault tolerance level that must be established before any write is acknowledged. For the fastest setting, this number is set to 0. The highest possible value of this number is M, where M is the number of coding disks—the highest setting requires that the maximum fault tolerance possible given the current erasure coding configuration be enforced, i.e., that all coding blocks corresponding to a given write have to be updated on the coding disks before the write is acknowledged.

Next, a free stripe is obtained from the list of free stripes, and a corresponding stripe state header is obtained. The RAID control circuit 415 then prepares to issue (e.g., it generates) IOs on a number of disks that are part of the current stripe, where the number is equal to the K+WRL. If the WRL is set to 0, then only the data disks need to be updated (i.e. the coding data will be written at a later stage).

Next, the fields in the stripe state header are set to indicate that the stripe is being modified and that none of the coding segments are updated.

Next, the input and output commands described above are issued, and the system waits for them to be completed.

When the last input or output commands in the set described above has been completed, the stripe state header is updated to show that the stripe is dirty but that some of the coding segments in the stripe are not updated: the number of such segments is equal to (M-WRL). The stripe header may be updated to show which segments contain valid data. This information is used when performing delayed updates to those Ethernet solid state drives 110.

Next, a write updater process is notified that new dirty stripe entries are available. This process obtains a stripe state header from a queue of such headers, obtains the list of coding segments that need to be updated; performs erasure coding computations to obtain the data blocks for those coding segments; writes those blocks to the disks corresponding to the coding segments; waits for those writes to complete; and clears the dirty bit from the stripe state header.

A stripe consistency check process (or "write update process") may be performed, as follows, on startup or at initialization when the system attempts to fix errors due to internal inconsistencies in a stripe that may arise when stripes are partially updated before system interruption. The following steps are executed in this method. The list of dirty stripe state headers is obtained. For each entry in the list, a number of steps are executed to ensure that data and coding segments within the stripe are consistent. The data segments are read to obtain the user data for the stripes. If there are delayed or in-progress coding segments as specified above, in the description of the write method with delayed computation of coding data (in the steps from the setting of the fields in the stripe state header, through the updating of the stripe state header, inclusive), then the coding data for those segments are computed and those segments are updated.

When all coding segments in the stripe header are updated, the stripe header is marked as clean (i.e., the dirty bit is cleared).

In some embodiments, a distributed redundant write-ahead-log (WAL) is used with the Ethernet solid state drives 110. Such an approach may leverage some low-latency nonvolatile memory (NVM) inside the Ethernet solid state drives 110 as a low-latency, distributed, mirrored, write-ahead-log (WAL). This has the benefit of optimizing write latency, because an NVMeoF write request can be acknowledged to the client as soon as the write data is stored in the mirrored WAL and without the need to wait for the Ethernet switch 105 to read data from the Ethernet solid state drives 110 for the erasure coding computations. The scalable nature of this WAL distributed across all of the Ethernet solid state drives 110 also has benefit in terms of write throughput, because it alleviates the write bottleneck of a localized WAL within the Ethernet switch 105.

In some embodiments, for each user write request, the Ethernet switch 105 performs a lookup or hash of the LBA (and NVMe namespace) for the incoming write request to get the IDs or addresses for a pair of Ethernet solid state drives 110 that provide a mirrored WAL. For large block writes, the lookup or hash may return a different pair of Ethernet solid state drives 110 for each segment in the erasure coding stripe. The WAL functionality may be load balanced across all of the Ethernet solid state drives 110 according to some fair mapping or hashing algorithm across all LBAs and NVMe namespaces.

The Ethernet switch 105 then duplicates the write request to the low-latency nonvolatile memory on the particular pair of Ethernet solid state drives 110 (potentially a different pair of Ethernet solid state drives 110 for each segment of a large block write). Such a write to the low-latency nonvolatile memory of an Ethernet solid state drives 110 may be accomplished via any of a number of protocols such as NVMeoF or TCP/IP where the target address is the low-latency nonvolatile memory on the Ethernet solid state drive 110, not the flash memory. Once the two Ethernet solid state drives 110 acknowledge the write to the low-latency nonvolatile memory, then the Ethernet switch can acknowledge the NVMeoF write to the client.

The Ethernet switch 105 then proceeds with performing the erasure coding algorithm to provide data protection of the data stored on flash. For a full stripe write, this entails performing an erasure coding computation across the full stripe of data, then writing each data and code segment to the corresponding Ethernet solid state drives 110, using an NVMeoF write command. Once each Ethernet solid state drive 110 has acknowledged the write, the Ethernet switch then requests the pair of Ethernet solid state drives 110 for the WAL mirror (per segment) to flush the corresponding data from the WAL.

For a partial stripe write, this entails first reading old data segments of the stripe from the corresponding Ethernet solid state drives 110 before performing the erasure coding computation across the full stripe of data, where the full stripe of data consists of a mix of newly written segments and old segments, i.e., read-modify-write of the whole stripe. The Ethernet switch 105 then proceeds with writing the data and code segments as in the full stripe write case, and then flushes the WAL mirror once all Ethernet solid state drives 110 have written their data to flash. Only the changed data segments of the stripe need to be written to flash.

During the period of time between when a new incoming write has been stored in the distributed mirrored WAL and when the write is stored to flash, any incoming NVMeoF read request to the same address needs to be directed to the new data stored in the WAL rather than the stale data in flash. This could be accomplished in a number of ways, including the following two.

In a first approach, the Ethernet switch 105 maintains a table (or content-addressable memory (CAM)) of LBAs that are known to have new data stored in the WAL. For each incoming NVMeoF read request, the Ethernet switch first looks up the LBA in the table/CAM. If there is a match, then the read request is changed to become a read from the WAL on one of the two Ethernet solid state drives 110 that have the new data. This lookup is done for the LBA of each segment of the read request, and it could turn out that some segments are read from WAL while other segments are read from flash.

In a second approach, the lookup/hash function that maps an LBA to pair of Ethernet solid state drives 110 for the WAL mirror is designed in way such that one of the two Ethernet solid state drives 110 in the mirror is the same Ethernet solid state drive 110 that ultimately stores the data in flash for the same LBA. An incoming NVMeoF read request for a given LBA can then be directly forwarded to the Ethernet solid state drive 110 for that LBA, and the onus is on that Ethernet solid state drive 110 to determine whether valid data is in the WAL or flash. This may be accomplished by maintaining a similar table/CAM in the Ethernet switch 105 as is described for the first approach, above.

If the second approach is used, then the write case can be further optimized since the write-to-flash of data that has just been stored in WAL can be achieved by copying the data from WAL to flash on the Ethernet solid state drive 110 instead of re-transferring the data from the Ethernet switch to the Ethernet solid state drive 110. Thus when the Ethernet switch sends an NVMeoF write command to an Ethernet solid state drive 110, it can specify the source address of the data to be the WAL on that Ethernet solid state drive 110.

Figure 6:
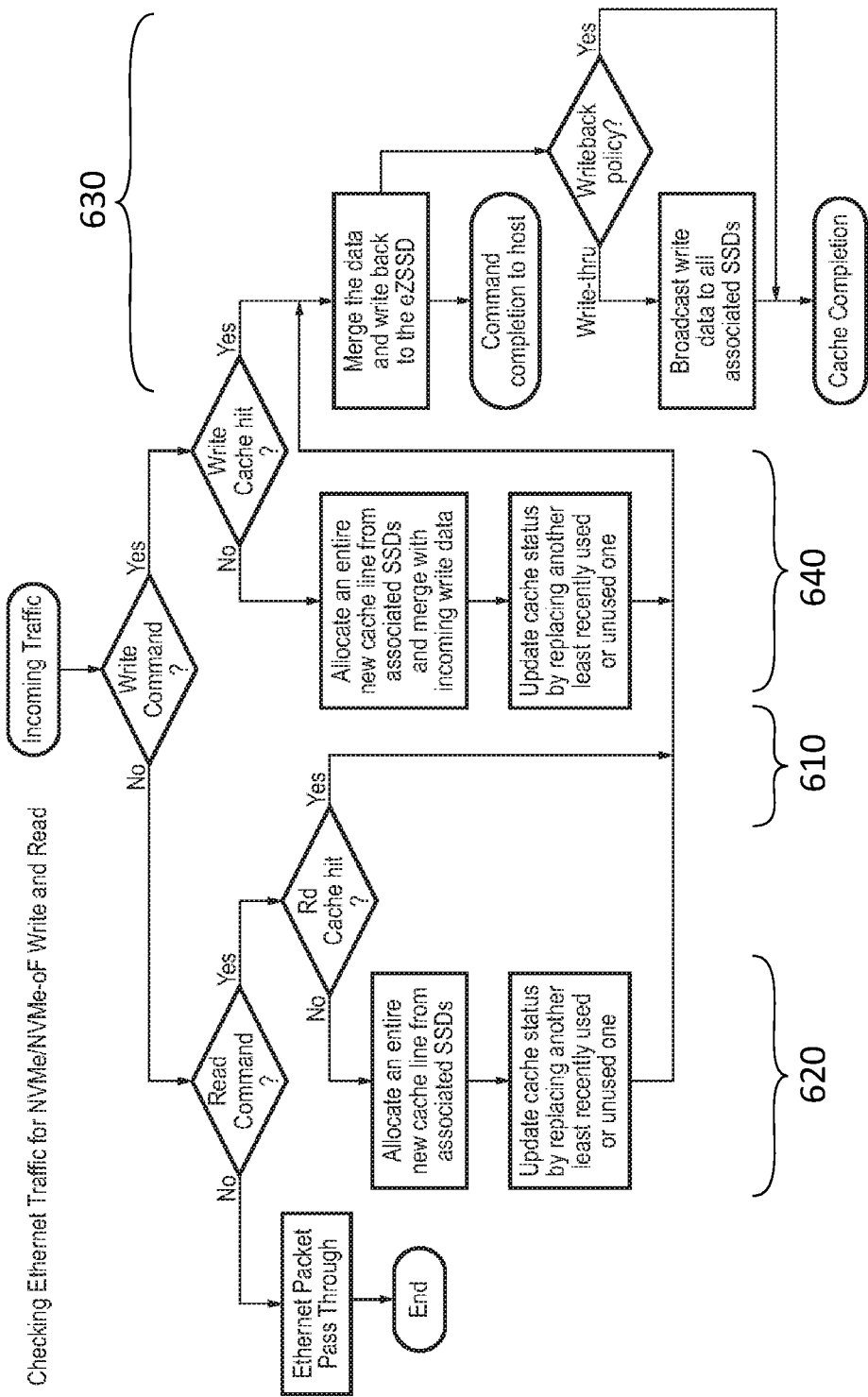
FIG. 6 is a flow chart of a method for responding to a command, according to an embodiment of the present invention.
Figure 7:
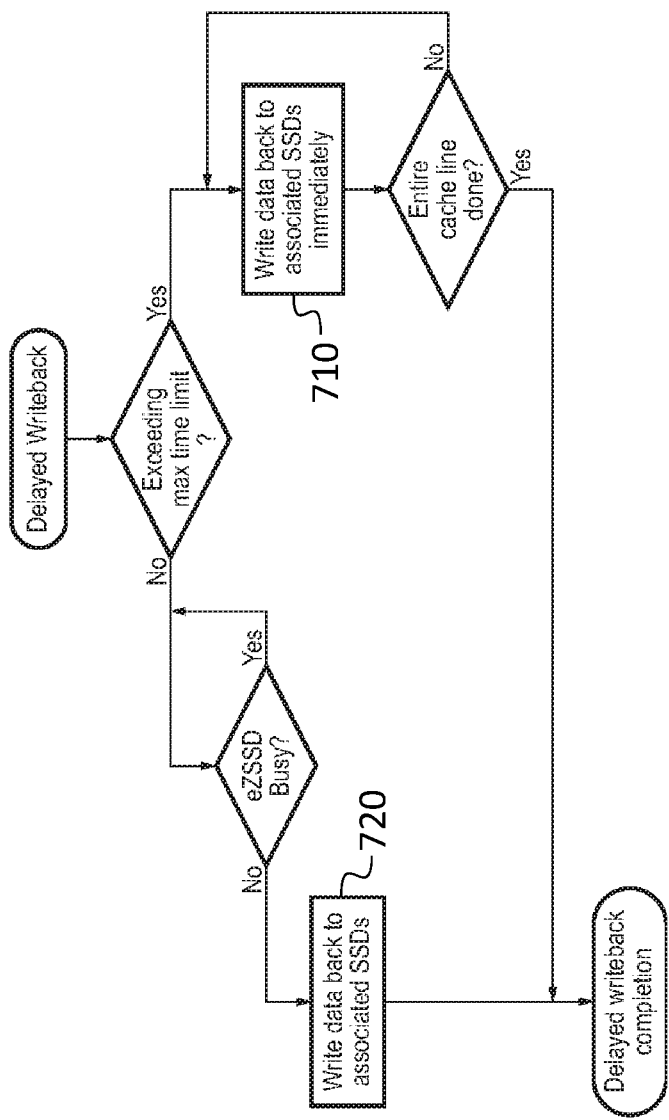
FIG. 7 is a flow chart of a method for delayed write back, according to an embodiment of the present invention.

FIG. 6 is a flow chart of the execution, in some embodiments, of read and write commands by the embodiment of FIG. 1A and FIG. 2. The following assumptions and terminology are used. As used herein, "eZSSD" is a generic name for low latency cache memory (also referred to herein as the cache device 130). It may be nonvolatile memory, or volatile memory such as DDR4 DRAM, SRAM etc. The eZSSD may be used as an IO cache buffer to minimize latency impact from RAID or erasure code operations. The eZSSD may employ either a delayed write-back or a write through cache policy. All incoming Ethernet traffic through the uplink 100 G ports (ports connecting to host/initiators) is checked by the RAID control circuit 415 for any write command. FIG. 6, shows steps that are performed (i) in the case of a read command when the command results in a cache hit (step 610, i.e., proceed to step 630), and when the command results in a cache miss (steps 620), and (ii) in the case of a write command when the command results in a cache hit (step 630), and when the command results in a cache miss (steps 640). FIG. 7 is a flow chart of a method for delayed write back. When a preset time limit has been exceeded, data are, at 710, written back to the associated Ethernet solid state drives 110 immediately, until the entire cache line has been written. When the preset time limit has not been exceeded, data are, at 720, written back to the associated Ethernet solid state drives 110 when the eZSSD is not busy.

Figure 8:
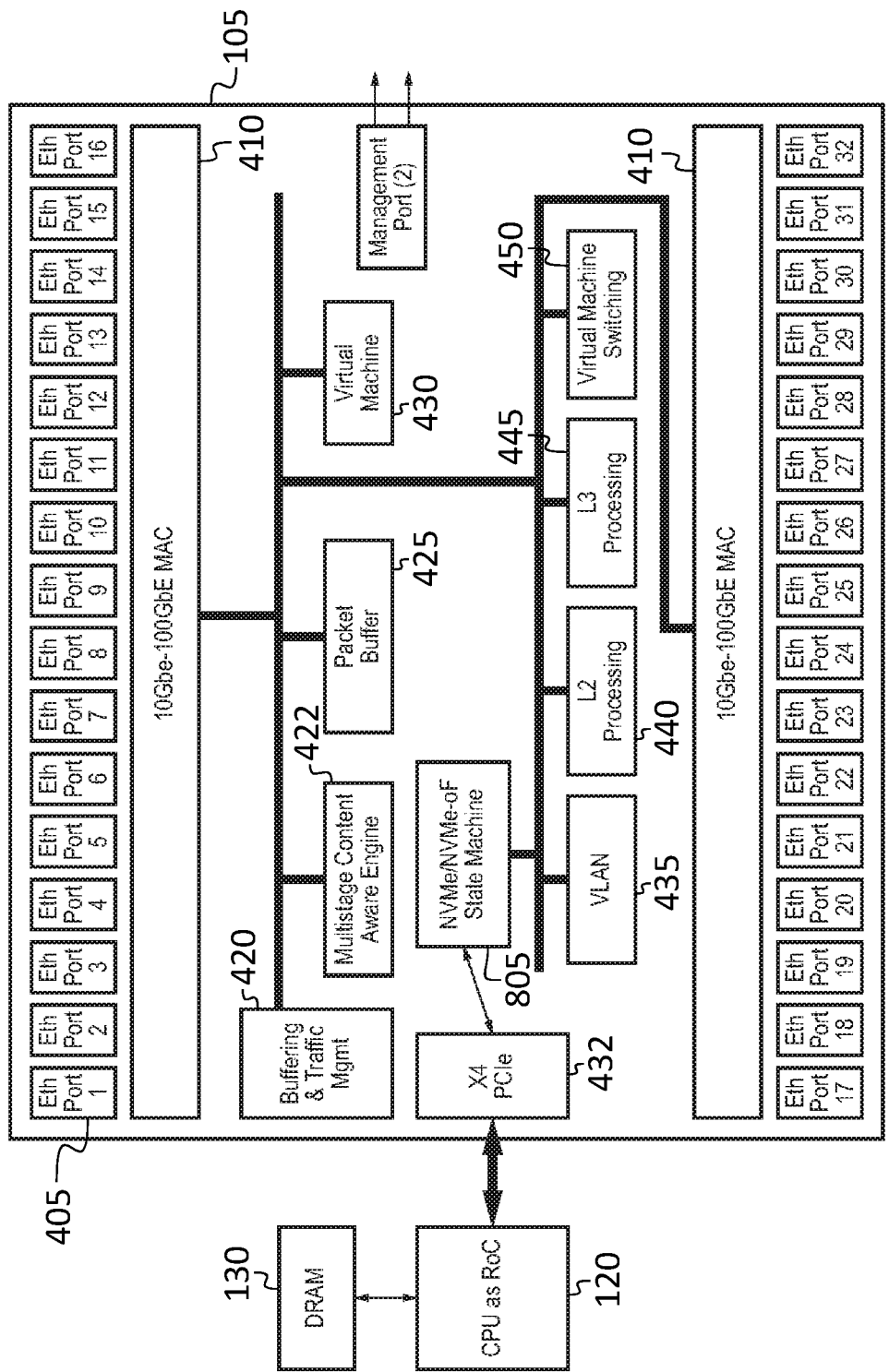
FIG. 8 is a block diagram of a portion of a storage system, according to an embodiment of the present invention.

Referring to FIG. 8, in some embodiments the Ethernet switch 105 includes a state machine 805 (instead of a RAID control circuit 415, as in FIG. 2). The NVMeoF bridge state machine 805 in the PCIe switch 115 receives NVMeoF commands from the remote initiator over uplink Ethernet ports. The commands are carried using a remote direct memory access (RDMA) protocol. Some examples of the RDMA transport are RDMA over converged Ethernet (RoCE) (IB based), RoCE v2 (UDP/IP based), and internet wide-area RDMA Protocol (iWARP) (TCP/IP based). The received commands are parsed by the NVMeoF state machine to identify what command is received. For IO commands such as read and write, the state machine forwards them to the local processor. The state machine may be relatively small (e.g., occupy a relatively small amount of chip area); in some embodiments the state machine includes fewer than one million gates (e.g., fewer than 200,000 gates). Read or write commands sent by a remote host or initiator are parsed by the state machine 805. Read commands are forwarded, by the state machine 805, directly to the destination Ethernet solid state drives 110, and write commands are forwarded, by the state machine 805, to the local central processing unit 120, which uses a dynamic random access memory (DRAM) as a cache device 130, and takes appropriate action depending on whether the write command results in a cache hit or cache miss. The dynamic random access memory may, like the cache device 130 of the embodiment of FIG. 1A and FIG. 2, have a latency at least five times lower (e.g., 10 times lower) than the flash memory in the Ethernet solid state drives 110, and accordingly may make possible performance improvements over an otherwise similar system lacking a low-latency cache. In any embodiment described herein, when a RAID controller 415 is present, some or all of the operations that otherwise may be performed by a local central processing unit 120 may instead be performed by the RAID controller 415, and in such embodiments the local central processing unit 120 may be absent.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for providing erasure code data protection for an array of solid state drives have been specifically described and illustrated herein, many modifications and variations will be apparent to those skilled in the art. Accordingly, it is to be understood that a system and method for providing erasure code data protection for an array of solid state drives constructed according to principles of this invention may be embodied other than as specifically described herein. The invention is also defined in the following claims, and equivalents thereof.

What is claimed is:

1. A system for providing protected data storage, the system comprising:
    an Ethernet switch;
    a plurality of Ethernet storage devices, one or more of the Ethernet storage devices being connected to the Ethernet switch;
    a local central processing unit, connected to the Ethernet switch,
    wherein the Ethernet switch comprises:
        a media access control circuit;
        a virtual local area network circuit;
        a layer 2 processing circuit;
        a layer 3 processing circuit; and
        a RAID control circuit, the RAID control circuit being configured to control the Ethernet storage devices as a redundant array of independent disks,
    wherein the RAID control circuit is connected to:
        the media access control circuit;
        the virtual local area network circuit;
        the layer 2 processing circuit; and
        the layer 3 processing circuit.

2. The system of claim 1, further comprising a cache device connected to the RAID control circuit.

3. The system of claim 2, wherein the RAID control circuit is configured, upon receipt of a write command comprising a write address, to:
    determine whether data corresponding to the write address are stored in the cache device; and
    when data corresponding to the write address are stored in the cache device, to modify the data stored in the cache device in accordance with the write command, and
    when data corresponding to the write address are not stored in the cache device:
        to allocate a space in the cache device,
        to read data from one or more Ethernet storage devices of the plurality of Ethernet storage devices into the space, and to modify the data in the space in accordance with the write command.

4. The system of claim 2, wherein the cache device has a latency lower than a latency of an Ethernet storage device of the plurality of Ethernet storage devices by at least a factor of 5.

5. The system of claim 2, wherein the Ethernet switch comprises the cache device.

6. The system of claim 5, wherein the cache device has a latency lower than a latency of an Ethernet storage device of the plurality of Ethernet storage devices by at least a factor of 5.

7. The system of claim 1, wherein the Ethernet switch is on a single semiconductor die.

8. The system of claim 1, wherein the local central processing unit is configured, at system initialization, to configure the Ethernet switch.

9. The system of claim 1, wherein the Ethernet switch is configured to forward Ethernet packets, received at a host port of the system addressed to a storage Ethernet address of the system, to the RAID control circuit.

10. The system of claim 1, wherein the Ethernet switch is configured to disregard Ethernet packets received at a host port of the system addressed to an Ethernet address of an Ethernet storage device of the plurality of Ethernet storage devices.

11. The system of claim 1, further comprising a peripheral component interconnect express (PCIe) switch, connected to one or more of the plurality of Ethernet storage devices and to the local central processing unit.

12. The system of claim 11, further comprising a baseboard management controller, connected to the PCIe switch.

13. A system for providing protected data storage, the system comprising:
    an Ethernet switch;
    a plurality of Ethernet storage devices, one or more of the Ethernet storage devices being connected to the Ethernet switch;
    a local central processing unit, connected to the Ethernet switch, wherein the Ethernet switch comprises:
  a media access control circuit;
  a virtual local area network circuit;
  a layer 2 processing circuit;
  a layer 3 processing circuit; and
  a state machine,
wherein the state machine is connected to:
  the media access control circuit;
  the virtual local area network circuit;
  the layer 2 processing circuit; and
  the layer 3 processing circuit, and
wherein the state machine and the local central processing unit are configured to control the Ethernet storage devices as a redundant array of independent disks.

14. The system of claim 13, further comprising a memory connected to the local central processing unit.

15. The system of claim 14, wherein the state machine and the local central processing unit are configured, upon receipt of a write command comprising a write address, to:
  determine whether data corresponding to the write address are stored in the memory; and
    when data corresponding to the write address are stored in the memory, to modify the data stored in the memory in accordance with the write command, and
    when data corresponding to the write address are not stored in the memory:
      to allocate a space in the memory,
      to read data from one or more Ethernet storage devices of the plurality of Ethernet storage devices into the space, and to modify the data in the space in accordance with the write command.

16. The system of claim 14, wherein the memory has a latency lower than a latency of an Ethernet storage device of the plurality of Ethernet storage devices by at least a factor of 5.

17. The system of claim 13, wherein the Ethernet switch is on a single semiconductor die.

18. The system of claim 13, further comprising a peripheral component interconnect express (PCIe) switch, connected to one or more of the plurality of Ethernet storage devices and to the local central processing unit.

19. The system of claim 18, further comprising a baseboard management controller, connected to the PCIe switch.

20. The system of claim 13, wherein the state machine includes fewer than 200,000 gates.

21. A method for operating a storage system, the storage system comprising:
  an Ethernet switch;
  a plurality of Ethernet storage devices, one or more of the Ethernet storage devices being connected to the Ethernet switch;
  a local central processing unit, connected to the Ethernet switch,
  wherein the Ethernet switch comprises:
    a media access control circuit;
    a virtual local area network circuit;
    a layer 2 processing circuit;
    a layer 3 processing circuit; and
    a RAID control circuit, the RAID control circuit being configured to control the Ethernet storage devices as a redundant array of independent disks,
  wherein the RAID control circuit is connected to:
    the media access control circuit;
    the virtual local area network circuit;
    the layer 2 processing circuit; and
    the layer 3 processing circuit,
  the storage system further comprising a cache device connected to the RAID control circuit,
  the method comprising, upon receipt of a write command comprising a write address:
    determining whether data corresponding to the write address are stored in the cache device; and
      when data corresponding to the write address are stored in the cache device, modifying the data stored in the cache device in accordance with the write command, and
      when data corresponding to the write address are not stored in the cache device:
        allocating a space in the cache device,
        reading data from one or more Ethernet storage devices of the plurality of Ethernet storage devices into the space, and modifying the data in the space in accordance with the write command.

* * * * *